United States Patent
Marra et al.

(10) Patent No.: US 11,181,638 B2
(45) Date of Patent: Nov. 23, 2021

(54) DISTANCE-MEASURING OPTOELECTRONIC SENSOR AND METHOD FOR MEASURING DISTANCES

(71) Applicant: SICK AG, Waldkirch (DE)

(72) Inventors: Martin Marra, Waldkirch (DE); Klaus Clemens, Waldkirch (DE)

(73) Assignee: SICK AG, Waldkirch (DE)

( * ) Notice: Subject to any disclaimer, the term of this patent is extended or adjusted under 35 U.S.C. 154(b) by 461 days.

(21) Appl. No.: 16/149,388

(22) Filed: Oct. 2, 2018

(65) Prior Publication Data

US 2019/0120961 A1 Apr. 25, 2019

(30) Foreign Application Priority Data

Oct. 20, 2017 (EP) .................................. 17197568

(51) Int. Cl.
*G01C 3/08* (2006.01)
*G01S 17/36* (2006.01)
(Continued)

(52) U.S. Cl.
CPC .............. *G01S 17/36* (2013.01); *G01S 7/484* (2013.01); *G01S 7/4861* (2013.01);
(Continued)

(58) Field of Classification Search
CPC ...... G01S 7/4913; G01S 7/484; G01S 7/4911; G01S 7/4861; G01S 17/36; G01S 17/10
(Continued)

(56) References Cited

U.S. PATENT DOCUMENTS

| 5,889,490 | A | * | 3/1999 | Wachter | .................. | G01S 17/36 342/127 |
| 2008/0088818 | A1 | * | 4/2008 | Mori | ....................... | G01S 17/10 356/5.1 |

(Continued)

FOREIGN PATENT DOCUMENTS

| DE | 197 57 849 B4 | 12/2004 |
| DE | 10 2004 041 500 A1 | 10/2005 |

(Continued)

OTHER PUBLICATIONS

O'Connor, et al., "Waveform Design Consideration for Modulated Pulse Lidar", Ocean Sensing and Monitoring VI, vol. 9111, 2014.
(Continued)

*Primary Examiner* — Mark Hellner
(74) *Attorney, Agent, or Firm* — Nath, Goldberg & Meyer; Jerald L. Meyer

(57) ABSTRACT

A distance-measuring optoelectronic sensor (10) for detecting and determining a distance of an object (16) in a monitoring area (14), the sensor (10) having a light transmitter (12) for transmitting a transmission signal, a light receiver (18) for generating a reception signal and a control and evaluation unit (24) configured to determine a light time of flight from the reception signal and, from that, the distance of the object (16), wherein the control and evaluation unit (24) is further configured to transmit at least one periodically modulated pulse as a transmission signal, to determine a reception time of the pulse in the reception signal and a phase offset of the modulation between transmission signal and reception signal in a neighborhood of the reception time and to determine the distance of the object (16) from the reception time and the phase offset.

18 Claims, 8 Drawing Sheets

(51) Int. Cl.
     *G01S 7/4911*     (2020.01)
     *G01S 7/4913*     (2020.01)
     *G01S 17/10*      (2020.01)
     *G01S 7/484*      (2006.01)
     *G01S 7/4861*     (2020.01)

(52) U.S. Cl.
     CPC ........... *G01S 7/4911* (2013.01); *G01S 7/4913* (2013.01); *G01S 17/10* (2013.01)

(58) Field of Classification Search
     USPC ....................................................... 356/5.11
     See application file for complete search history.

(56) References Cited

U.S. PATENT DOCUMENTS

2017/0343652 A1*  11/2017  de Mersseman ....... G01S 17/58
2018/0275252 A1*   9/2018  Fried ....................... G01S 17/66

FOREIGN PATENT DOCUMENTS

| EP | 1 972 961 B1 | 2/2012 |
| EP | 2 942 645 B1 | 3/2016 |
| EP | 2 942 644 B1 | 5/2016 |
| EP | 3 124 992 B1 | 7/2017 |

OTHER PUBLICATIONS

European Search Report dated May 2, 2018 issued in corresponding European Application No. 17197568.3.

* cited by examiner

DISTANCE-MEASURING OPTOELECTRONIC SENSOR AND METHOD FOR MEASURING DISTANCES

FIELD

The invention relates to a distance-measuring optoelectronic sensor and a method for detecting and determining a distance of an object in a monitoring area.

BACKGROUND

For optical distance determination, the time of flight of a light signal is often measured, which corresponds to the distance via the speed of light. A distance-measuring sensor is aimed at a target whose distance is to be measured. In order to extend the measuring range, the scanning beam can be moved, as is done in a laser scanner. There, a light beam generated by a laser periodically scans over the monitoring area with the aid of a deflection unit. In addition to the measured distance information, the angular position of the deflection unit is used to determine the angular position of the object, and thus the location of an object in the monitoring area is detected in two-dimensional polar coordinates. In most laser scanners, the scanning movement is achieved by a rotary mirror. However, it is also known to instead rotate the entire measuring head with light transmitters and light receivers, as for example described in DE 197 57 849 B4.

Conventionally, a distinction is made between pulse-based and phase-based light time of flight measurement. In a pulse time of flight method, a short light pulse is transmitted, and the time until reception of a remission or reflection of the light pulse is measured. Alternatively, in a phase method, the amplitude of the transmission light is modulated and a phase shift between transmission light and reception light is determined, wherein the phase shift is also a measure of the light time of flight.

For pulse methods, a further distinction can be made between single pulse measurement with only one strong pulse per measurement and so-called pulse averaging methods. In the latter case, several individual pulses are transmitted, the associated reception signals are accumulated and are evaluated together. EP 1 972 961 B1 introduces such a method, which only reads out the individual reception signals with two values by means of binarization and which can be implemented very efficiently. EP 2 942 645 B1 extends this to three states of the reception signal by using two thresholds. In EP 2 942 644 B1, a multiple threshold scanning takes place. As with many known pulse averaging methods, suitable filtering in the analog part of the reception path has an important role to play.

Single pulse methods are characterized by a long range and a high signal-to-noise ratio due to the comparatively high pulse energy. They are also capable of multi-echo detection, i.e. they can measure distances to several partially transparent objects arranged one behind the other along the measuring beam. However, the measurement accuracy is limited, which is related to the pulse length. It is not only extremely complex to generate individual pulses in the picosecond range from a technical point of view. In addition, for normal ranges enormous pulse powers would be required, for example already about 1 kW for a pulse length of 250 ps.

Phase methods in many respects have an opposite behavior. For sufficient signal-to-noise ratio, there are minimal systematic errors, since interference effects such as a transmit-to-sample jitter are averaged down to quartz accuracy. This averaging also means that it is not possible to deal with several echoes from several targets. In addition, for reasons of eye protection, low optical output powers have to be used, for example 1 mW, since the transmission signal is continuously active. Even after relatively short distances, the useful signal is already within the noise base level, the signal-to-noise ratio is very low, and the range limited. Furthermore, there is a limited uniqueness range that depends on the modulation frequency. Since the measurement accuracy is related to the modulation frequency, the uniqueness range shrinks again with higher modulation frequencies. In order to deal with this, multiple modulation frequencies are conventionally used one after the other, which in turn increases the measurement time.

Apart from the uniqueness problem, a very high modulation frequency would be desirable for phase methods, leading to particularly high measurement accuracy. However, the modulation frequency must still be manageable at the receiver. The receiving element usually is a PIN diode or an APD (avalanche photodiode), and the maximum bandwidth is determined by the parasitic capacitance of the diode in conjunction with the input resistance of a trans-impedance amplifier in the reception path. There is an interrelation between the bandwidth and the size of the photodiode, which in turn determines the optical efficiency: The higher the bandwidth, the smaller the photodiode, thus the lower the optical efficiency, and vice versa. With a 1 mm2 photodiode, modulation frequencies in the range of 100 MHz can be achieved according to the prior art. For a modulation frequency in the GHz range, the aforementioned area of 1 mm2 would have to shrink by at least one order of magnitude, and the incident light on such a small area is generally no longer sufficient for robust detection.

In order to achieve a particularly high sensitivity, an avalanche photodiode can be biased above the breakdown voltage and thus operated in the so-called Geiger mode (SPAD, Single Photon Avalanche Diode). In a normal APD, the incident light triggers a controlled avalanche effect, and a photocurrent proportional to the light receiving intensity is generated. In the Geiger mode, on the other hand, a single charge carrier released by a single photon is sufficient to trigger an uncontrolled avalanche, which then recruits all available charge carriers due to the high field strength. Subsequently, the avalanche runs out (passive quenching), and the SPAD is no longer available for detection for a certain dead time. Alternatively, it is also known to detect and extinguish the avalanche from the outside (active quenching). A special feature is the fact that even a minimal interference event, such as an interference light photon or dark noise, generates the same maximal reception signal as a useful light signal.

In order to use the reception signal of a SPAD for a distance measurement, it must be read out or tapped. However, this is not possible with conventional approaches for high-frequency signals. Therefore, the high sensitivity of SPADs does not initially help to overcome the contradiction between bandwidth and optical efficiency described above. From EP 3 124 992 B1, a SPAD light receiver is known which is read out via an active coupling element and can thus process a considerably higher bandwidth. There, however, this is not discussed in connection with a phase method.

For any distance-measuring sensor, a decision must therefore be made as to which strengths of the respective methods to determine the light time of flight are required, depending on the intended area of application, and the disadvantages must then be accepted. Pulse averaging methods are sort of between single pulse methods and phase methods and can therefore be a good compromise. Conversely, this means that the disadvantages of both methods are also retained, albeit in an attenuated form.

SUMMARY

It is therefore an object of the invention to improve distance measurement in a time of flight method.

This object is satisfied by a distance-measuring optoelectronic sensor for detecting and determining a distance of an object in a monitoring area, the sensor having a light transmitter for transmitting a transmission signal, a light receiver for generating a reception signal and a control and evaluation unit configured to determine a light time of flight from the reception signal and, from that, the distance of the object, wherein the control and evaluation unit is further configured to transmit at least one periodically modulated pulse as a transmission signal, to determine a reception time of the pulse in the reception signal and a phase offset of the modulation between transmission signal and reception signal in a neighborhood of the reception time and to determine the distance of the object from the reception time and the phase offset.

The object is also satisfied by a method for detecting and determining the distance of an object in a monitoring area, wherein a transmission signal is transmitted by a light transmitter, a reception signal is generated by a light receiver and a light time of flight is determined from the reception signal and, from that, the distance of the object, wherein at least one periodically modulated pulse is transmitted as a transmission signal, a reception time of the pulse in the reception signal and a phase offset of the modulation between transmission signal and reception signal in a neighborhood of the reception time are determined, and the distance of the object is determined from the reception time and the phase offset.

The sensor has a light transmitter, a light receiver and a control and evaluation unit to transmit a light signal, receive it again and measure the light time of flight by evaluating the reception signal and thus measure the distance to an object.

The invention starts from the basic idea of combining a pulse method and a phase method. For this purpose, a pulse is used as the transmission signal, which is modulated in addition to its pulse shape. Such a modulated pulse can also be called a burst and forms, on the transmission side, the superposition of the signals used for a pulse method and a phase method, respectively. In order to rule out misunderstandings, it should be made clear that the modulation is an amplitude modulation and has nothing to do with the wavelength of the light.

On the one hand, a reception time is located in the reception signal like in a pulse method. This is ultimately an evaluation of the position of the pulse in the reception signal, for example an envelope curve of the modulated pulse. The resulting information corresponds to a first pulse-based distance measurement, wherein for example the center of gravity of the modulated pulse provides a first, still comparatively inaccurate distance value. On the other hand, a phase offset between the transmission signal and the reception signal, or in other words the phase position of the reception signal, is determined like in a phase method. This is preferably limited to a neighborhood of the reception time, so that the phase information does not mix in case of multiple targets. The phase shift refines the distance measurement based on the reception time. This can also be understood as the pulse-based measurement resolving the ambiguity of the phase method by means of the reception time. Thus, the correct period corresponding to the actual distance is identified based on the pulse, and the exact phase position within this period is also determined. In addition, in the case of multiple echoes and multiple targets, the correct burst can be detected based on the reception times.

The invention has the advantage that the strengths of pulse and phase methods are combined, while at the same time the weaknesses are largely compensated. Thus, a good signal-to-noise ratio with a long range is achieved as in a pulse method. The uniqueness range corresponds to a pulse method and is limited by virtually nothing but the pulse repetition frequency, and the multiple echo capability is also retained. At the same time, accuracy is determined by the phase method, wherein very high modulation frequencies can be chosen, because the usual uniqueness problem of a phase method no longer exists due to the combination. The measurement remains very fast and can already determine a distance from individual pulses or individual bursts, respectively, wherein a multi-pulse method similar to a pulse averaging method is also conceivable. The costs are low even with very high measuring accuracy, since a high-frequency range is also covered with high-frequency standard components such as oscillator, mixer and filter. Scalability is also guaranteed, because changing individual parameters can be easily prioritized between the various benefits.

The pulse is preferably modulated at a frequency of at least 500 MHz, at least 1 GHz, at least 2 GHz or more. Throughout this specification, the terms preferred or preferably refer to an advantageous, but completely optional feature. Such a frequency is higher by factors than what is currently used in phase methods according to the prior art, so that there is also a drastic improvement in measurement accuracy. The use of the 2.4 GHz ISM frequency band (Industrial, Scientific and Medical Band) is preferred, as numerous commercially available high-frequency components are designed for this frequency band. In principle, other frequency bands, such as the 5 GHz band or another frequency band used by future standards, are also conceivable. A single pulse method with pulse lengths corresponding to a period of a GHz signal would have to use picosecond pulses, but then, as already mentioned above, unrealistically high pulse powers would be required.

The control and evaluation unit preferably provides a base frequency and comprises a transmission-side mixer with a clock faster than the base frequency for mixing up to a modulation frequency for modulating the pulse. The base frequency is, for example, 10 MHz or another frequency that can easily be processed in the control and evaluation unit, and the subsequent modulation for the pulse preferably is initially generated at the base frequency. For this purpose, the basic clock can be converted into a sinusoidal signal by a low-pass filter, which is then mixed up to the modulation frequency.

In a preferred embodiment, the transmission-side mixer is configured as an I/O mixer or IQ modulator. This ensures reliable mixing up to the modulation frequency, and an I/O mixer also offers further possibilities for modifying or changing the modulation frequency.

The clock preferably generates a frequency corresponding to a non-integer multiple of the base frequency. Consequently, the modulation frequency is constant, but slightly detuned with respect to the base frequency. Components of the evaluation circuit, in particular filters, show transient effects of the modulated pulse which depends on the phase of the respective base frequency or modulation frequency. The detuning causes different phases at the beginning of the modulated pulse due to beat effects and thus varies the transient effects. In the preferred case of multiple measurement repetitions, the measurement errors generated by the transient effects will therefore be averaged out.

The control and evaluation unit is preferably configured to change the modulation frequency. Therefore, it can be measured at different frequencies in order to obtain an even better measurement result due to contributions of measurement results with modulated pulses having different behavior. A phase measurement with multiple frequencies also makes it possible to extend the uniqueness range beyond the desired range of the sensor, which is used in some embodiments in addition to the resolution of ambiguities by determining the reception time of the modulated pulse. The change of the modulation frequency is preferably achieved by changing sidebands or inverting a baseband signal of a mixer configured as an I/O mixer, or by providing at least two bandpass filters of different passband frequency. Then, it can be measured at different frequencies without transients from PLLs or similar components of the clock.

The control and evaluation unit preferably comprises a pulse generating unit for setting time windows for the modulated pulse. With these time windows (gating), a modulated pulse can be generated from a continuous periodic signal. For example, a modulated signal source is only connected to the light transmitter during the time window defined by the pulse generation unit, so that a burst is generated, the pulse and the modulated signal effectively being multiplied with one another. The pulse generating unit can operate with the basic clock because the pulse length is already greater than one period of the modulation frequency, so that the modulated pulse has at least more than one or some periods of modulation to accurately determine the phase shift.

The control and evaluation unit is preferably configured to offset a time window by a fraction of the base frequency. Then, the respective modulated pulses start with a different phase. As already explained above in connection with the detuning of the modulation frequency against the base frequency, the transient effects of certain components of the control and evaluation electronics are related to this phase and are therefore varied in this way. This improves the determination of the phase shift and thus the distance measurement, especially after averaging over several measurements.

The control and evaluation unit is preferably configured to base a determination of the distance on at least two measurements with modulated pulses of different length. A long modulated pulse comprises many periods of the modulation frequency and thus enables a particularly precise determination of the phase shift. A short modulated pulse improves the multi-echo capability because the received modulated pulses no longer run into each other even with short distance differences between several targets.

The control and evaluation unit is preferably configured to transmit an unmodulated auxiliary pulse and to determine its light time of flight. According to the invention, a pulse method is already used which determines the reception time of the modulated pulse. However, this is not always accurate enough, especially for multiple targets close to one another. If the modulated pulse alone cannot provide a sufficiently accurate measurement, ambiguities in the phase method may no longer be reliably resolved. Then, a pulse method with the auxiliary pulse is used as a support. In principle, pulse measurement via the auxiliary pulse could even replace measurement via the modulated pulse. Preferably, the pulse repetition frequency of the auxiliary pulse deviates from the measurement repetition rate, i.e. the pulse repetition frequency of the modulated pulse. In that case, the auxiliary pulse has a variable delay with respect to the modulated pulse, and interferes at a different position in each repetition. In particular in an averaging method, interference effects of the auxiliary pulse are distributed in such a way that they no longer have any effect on the measurement with the modulated pulse.

The light receiver preferably comprises a plurality of avalanche photodiode elements, each of which is biased at a bias voltage above a breakdown voltage and thus operated in a Geiger mode. The light receiver consequently is a SPAD receiver with very high sensitivity. A bandwidth limitation by the signal tap is not a physical necessity, but can be solved, for example, by suitable circuitry. Such a light receiver can therefore show very good high-frequency behavior, even in frequency ranges far above what is usual for prior art PIN diodes or APDs.

The sensor preferably comprises a signal tap circuit for reading out the avalanche photodiode elements, the signal tap circuit having an active coupling element with an input which is connected to an avalanche photodiode element and an output, the active coupling element mapping a Geiger current of the avalanche photodiode element at the input to a measuring current corresponding to the Geiger current in course and level in that the input forms a virtual short circuit against a potential for the Geiger current, and the output is decoupled from the input. This signal tap circuit is an example of how SPADs can be operated with broad bandwidth to achieve high modulation frequencies with correspondingly high phase measurement accuracy. Due to the active coupling element and the virtual short circuit, the Geiger current can almost completely flow out of the respective triggering avalanche photodiode element and into the signal tap circuit. At the same time, the measuring current is almost completely decoupled from the Geiger current by the coupling element. Further processing of the measuring current therefore has no effect on the Geiger current. The course of the measuring current starts to considerably deviate from the Geiger current due to frequency-related losses only for changes in the higher gigahertz range, in particular above two or three GHz. The coupling element preferably has exactly one signal tap transistor and thus a very simple and cost-effective design.

The control and evaluation unit preferably has a reception-side mixer which mixes the reception signal down to a base frequency while maintaining the phase. The evaluation can be carried out at the comparatively slow base frequency, so that significantly simpler components are sufficient. The base frequency is preferably the same which is also the starting point for mixing up on the transmitter side. Thus, transmission-side mixer and reception-side mixer enable carrying out the signal generation and evaluation practically in the basic clock, with the high modulation frequency only being used on the light path. The reception-side mixer preferably is an/Q mixer or IQ demodulator, which is preferably combined with a transmission-side IQ modulator. An IQ demodulator provides two signals via I and Q and thus twice as much phase information, which enables an even more precise determination of the phase shift.

The control and evaluation unit preferably has a first reception path for determining the reception time and a second reception path for determining the phase shift. The paths can be separated either after the signal tap or only after mixing down. The evaluation is parallelized by separate paths, with the measurement information being merged afterwards. In particular, the phase offset is used to refine the distance value determined from the pulse position, or in other words, the pulse position is used to find the correct period and thus resolve the ambiguity of the phase method.

The control and evaluation unit is preferably configured to perform a plurality of individual measurements, each with at least one modulated pulse, to form a common reception signal from the individual measurements, and to evaluate the common reception signal for the determination of at least one of reception time and phase offset. The result is kind of a pulse averaging method as in EP 1 972 961 B1 mentioned in the introduction, but with the individual pulses being modulated, which could be described as a burst averaging method. A common reception signal of the individual measurements is generated from several individual modulated pulses by adding up, averaging or the like, and then the common reception signal is evaluated, which, among other things, improves the signal-to-noise ratio and enables reliable evaluation even with comparatively weak reception signals.

A local combination of several individual avalanche photodiode elements is possible instead of or in addition to a temporal statistical evaluation, in particular for SPAD receivers. In this generalization of a pulse averaging method, the control and evaluation unit is preferably designed to statistically evaluate the reception signals of multiple avalanche photodiode elements and/or reception signals from different times. This also compensates for the effect that SPADs generate an equally strong signal from individual interfering light photons or dark noise as from useful light, and that a detection is followed by a dead time for practically the entire remaining individual measurement.

Not only a weak useful signal, but also such SPAD-specific effects are compensated by accumulating detection events over time and/or location and common statistical evaluation.

The method according to the invention can be modified in a similar manner and shows similar advantages. Further advantageous features are described in an exemplary, but non-limiting manner in the dependent claims following the independent claims.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
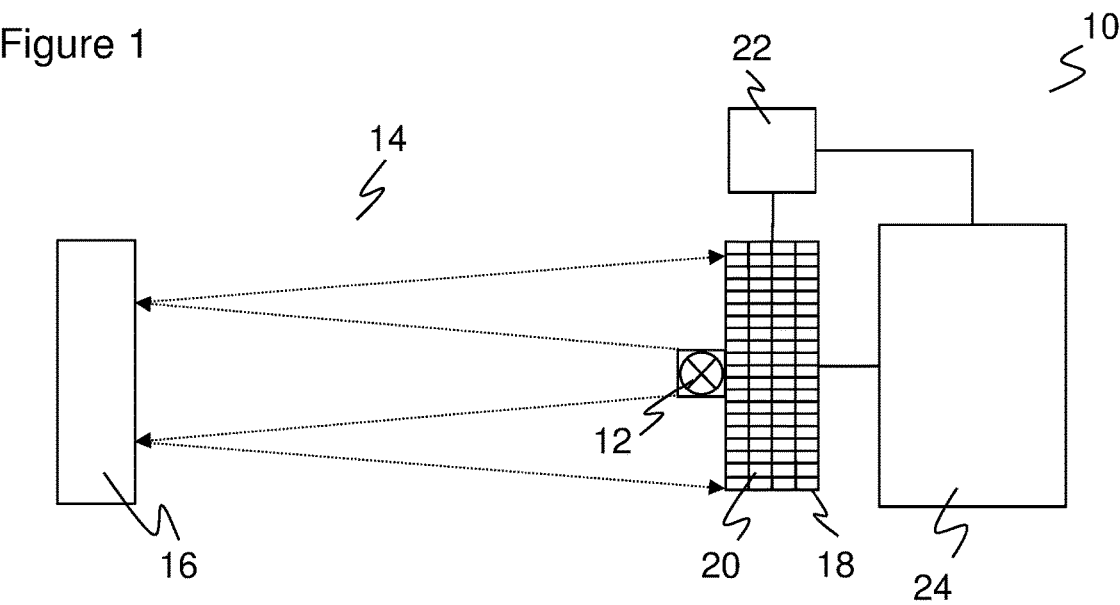
FIG. 1 a simplified block diagram of an optoelectronic sensor for light time of flight measurement.

FIG. 1 shows a simplified schematic block diagram of an optoelectronic sensor 10 in an exemplary one-dimensional or single beam embodiment. A light transmitter 12, for example an LED or a laser light source, transmits a light signal into a monitoring area 14. When impinging on an object 16, part of the light signal is remitted or reflected and returns to a light receiver 18. In this embodiment, the light receiver 18 comprises a large number of light receiving elements which are configured as avalanche photodiode elements 20 in Geiger mode or SPADs. The avalanche photodiode elements 20 are, for example, arranged in a matrix, a line or another pattern or are arranged irregularly. In other embodiments, the light receiver 18 does not comprise SPADs, but other light receiving elements, or it is a single detector with only one light receiving element.

The reception signals of the avalanche photodiode elements 20 are read via a signal tap circuit 22 and evaluated by a control and evaluation unit 24. Conversely, the control and evaluation unit 24 can also act on light transmitter 12 and/or light receiver 18, for example to form and trigger the light signal or to determine its properties, or to set properties of light receiver 18.

The separation into light receiver 18, signal tap circuit 22 and control and evaluation unit 24 in FIG. 1 is also conceivable in practice, but primarily is a means of explanation. Preferably these elements are at least partially integrated on a common chip whose area is shared by light-sensitive areas of the avalanche photodiode elements 20 and circuits assigned to individual or groups of avalanche photodiode elements 20 for their evaluation and control. The optical arrangement with a light transmitter 12 covering a small part of the light receiver 18 is also purely exemplary. Other known optical solutions can alternatively be used, such as autocollimation with a beam splitter and a common lens, or pupil splitting where two separate lenses are provided and light transmitter and light receiver are arranged next to one another.

In order to measure the distance of object 16, the control and evaluation unit 24 determines a light time of flight from the transmission of a light signal to its reception and converts this into a distance via the speed of light. According to the invention, a combination of a pulse method and a phase method is used, which will be explained in more detail later with reference to FIGS. 3 to 9. Multiple sensors 10 can be connected to each other to form a scanning light grid with multiple, usually parallel beams, which measures or monitors distances in each beam. Mobile systems are also conceivable, in which the sensor 10 is movably mounted. In addition, the sensor 10 can also be configured as a laser scanner with a movable deflection unit for scanning the monitoring area 14.

Figure 2:
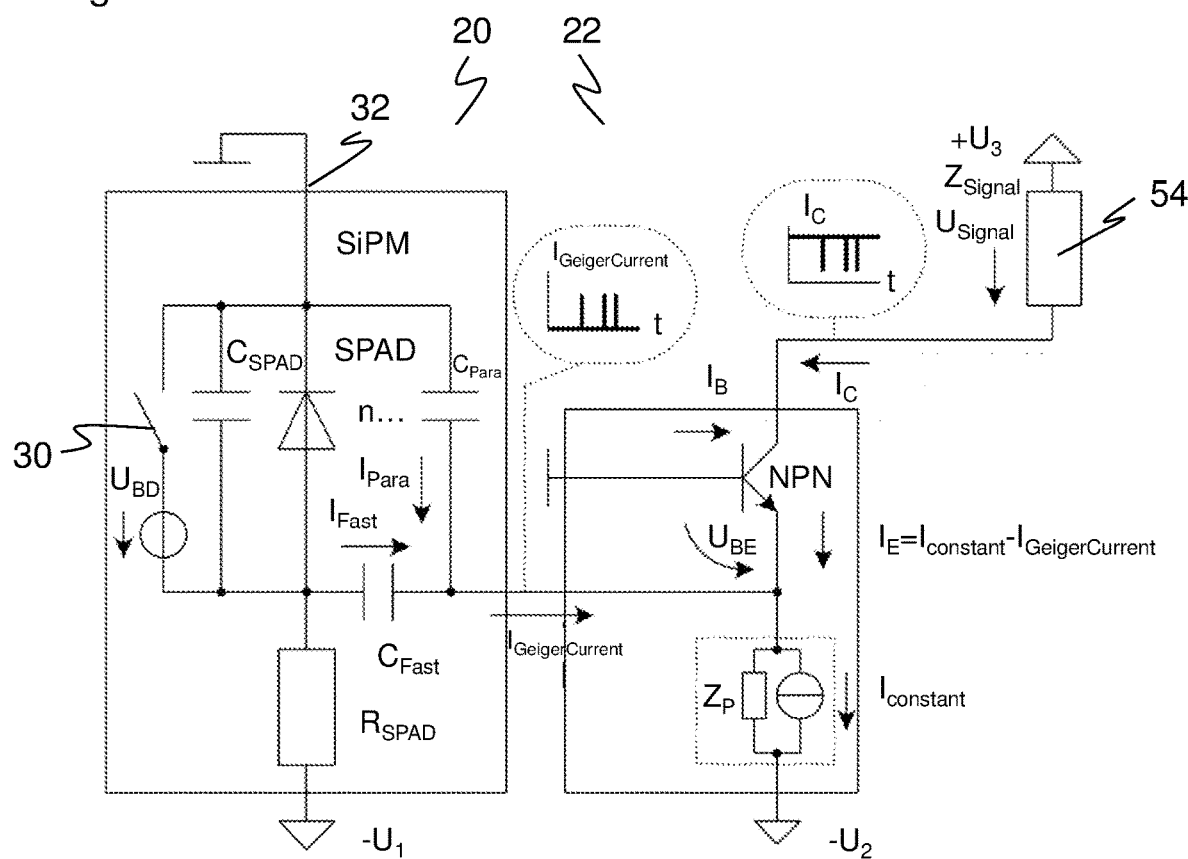
FIG. 2 a simplified circuit diagram of an avalanche photodiode in Geiger mode with a signal tap circuit.

FIG. 2 shows a simplified exemplary circuit diagram of an avalanche photodiode 20 and a signal tap circuit 22. As already explained in the introduction, it is a contradiction for a conventional light receiver to provide both a high bandwidth and a high sensitivity, because a high bandwidth is accompanied by a small reception area. The example shown in FIG. 2, however, is a circuit of an avalanche photodiode element 20 with a signal tap circuit 22 suitable for high frequency despite its high sensitivity.

The number of avalanche photodiode elements 20 varies, depending on the component and target requirements, and can amount to several thousand and more. Such a component can be manufactured in a CMOS process, for example. The breakdown voltage of the avalanche photodiode elements 20 is significantly lower than with conventional avalanche photodiodes, for example at most 50 V or at most 30 V. Groups or all of the avalanche photodiode elements 20 can be electrically interconnected. This enables statistical methods that compensate for the fact that a single avalanche photodiode element 20 in Geiger mode can be mistriggered by a single interference light photon and cannot be activated for some time after each triggering. The representation of FIG. 2 of a signal tap circuit 22 for a single avalanche photodiode element 20 is therefore only one example, a signal tap circuit 22 can also be responsible for a group or all avalanche photodiode elements 20.

The actual structure of the semiconductor device is assumed to be known and is not explained. In the equivalent circuit diagram in FIG. 2, avalanche photodiode element 20, on the one hand, shows the behavior of a diode 26 and also has a capacitance represented by the capacitor 28 connected in parallel. An avalanche breakthrough is triggered by at least one incident photon, which acts like a switch 30. In a standby mode, a voltage above the breakdown voltage is applied to diode 26 by means of a first electrode 32 and a second electrode 34. Then, if an incident photon generates a pair of charge carriers, this has an effect like closing the switch 30, so that the avalanche photodiode element 20 is flooded with charge carriers and a so-called Geiger current flows. However, new charge carriers are generated only as long as the electric field remains strong enough. If the capacitor 28 is discharged far enough that the voltage falls lower than the breakdown voltage, the avalanche stops automatically ("passive quenching"). Subsequently, the capacitor 28 is recharged from electrodes 32, 34 via a resistor 36 until a voltage above the breakdown voltage is applied to diode 26 again. There are alternative configurations in which the avalanche is detected from the outside, and then a discharge below the breakdown voltage is triggered ("active quenching").

During the avalanche, the output signal rises rapidly and independently of the intensity of the triggering light to a maximum value and then drops again after the avalanche has been extinguished. The time constant of the drop, which corresponds to a dead time of the avalanche photodiode element 20, is typically in the range of a few to several ten nanoseconds. The dead time is not an absolute dead time, because as soon as the bias voltage is large enough to support an avalanche, the output signal can also increase again, but not to the same extent as from the standby state. The amplification factor is up to $10^6$ and mainly results from the maximum number of charge carriers that can be recruited by the avalanche in the avalanche photodiode element 20.

The function of the signal tap circuit 22 is to derive a measuring signal from the Geiger current during an avalanche breakthrough, if possible using the full current flow, so that even high-frequency components are retained and a high signal-to-noise ratio is achieved. Preferably, the signal is capacitively coupled via coupling capacitor 38. In the exemplary embodiment as shown, the avalanche photodiode element 20 has a third electrode 40 for reading out a measuring signal, this third electrode 40 being connected via the coupling capacitor 38. Reading out via the third electrode 40 can have advantages, but is only an option. Alternatively, one of the other electrodes 32, 34 is used to read out, but then the resistor 36 is preferably bridged for high frequencies via a parallel capacitor.

The other avalanche photodiode elements 20 which are not shown in FIG. 2 form parasitic capacitances 42 from the point of view of the shown avalanche photodiode element, which may be increased by other parasitic effects. The parasitic capacitance 42 is a sum of the numerous other avalanche photodiode elements and can therefore be significantly larger than the capacitance of the associated coupling capacitor 38. The parasitic capacitance 42 behaves like a low-pass filter that blocks high-frequency signals.

The signal tap circuit 22 should have both the lowest possible signal resistance to achieve high speeds or bandwidths and a high signal resistance to achieve high sensitivity. In order to meet these contradictory requirements, the signal tap circuit 22 uses an active circuit solution with an active coupling element 44, which in FIG. 2 is configured as a bipolar NPN transistor in a base circuit. Other active elements, especially other transistors (FET), a different polarity (PNP) or a different circuit (emitter circuit) are conceivable. In addition, several transistors can be used instead of a single-stage circuit with only one signal tap transistor.

The active coupling element 44 has several significant advantages for the signal readout. Firstly, it offers virtually no resistance to the Geiger current, which is tapped via capacitive coupling as a current pulse, and thus forms a virtual short circuit. In practice, this is not completely possible, but less than one Ohm is quite realistic. As a result, there are no relevant voltage changes and thus no reloading processes and no current flow at the parasitic capacity 42 despite the avalanche. Almost the entire Geiger current flowing through the coupling capacitor 38 is therefore available to the active coupling element 44 on the input side. Without the virtual short circuit, on the other hand, clearly noticeable portions of the Geiger current would be lost in the parasitic capacitance 42, and what is even worse, the fast, high-frequency signal components would be suppressed by the low-pass behavior.

Secondly, the active coupling element 44 generates a measuring current on the output side which corresponds to the Geiger current in its course and level. The active coupling element 44 can also change the measuring current compared to the Geiger current by its transfer function on purpose, in particular amplify it. To this end, almost the entire current of the avalanche breakthrough is available at the coupling element 44. The measuring current can subsequently be read out on the output side as a detection result for further processing. The measuring current is supplied from a current source of the active coupling element 44 and not from the avalanche photodiode element 20.

Thirdly, input circuit and output circuit are decoupled from one another. The further processing of the measuring current has no effect on the Geiger current, within the technical limits of a real decoupling. For this reason, practically any subsequent stages are possible which, unlike conventional signal readout, have no interfering feedback on the Geiger current.

In the specific example of FIG. 2, the emitter of the active coupling element 44 forms input 46, to which the Geiger current is fed by the third electrode 40. The base is connected to ground or, more generally, to a fixed potential, and thus virtually short-circuited. The collector forms output 48, at which the measuring current is provided. The emitter circuit of the transistor also contains a constant current source 50 between input 46 and a supply voltage −U2. As a result, a direct current flows at times outside avalanche breakthroughs, which adjusts the operating point of the transistor. The constant current source 50 can alternatively be passive like with resistor 52 or be a combination of both, as shown in FIG. 2. The measuring current is tapped at output 48. A simple measuring impedance 54 is only one example of any measuring circuits that can have further active and/or passive elements. Due to the decoupling by means of the signal tap circuit 22, these measuring circuits have practically no feedback effect on the actual measurement.

The signal tap circuit 22 has a significantly improved high-frequency behavior with an almost flat frequency response up to a few GHz, and a significant signal drop only beyond. In contrast, in a conventional signal readout, the measurement signal breaks down at moderate frequencies far below the GHz range.

Figure 3:
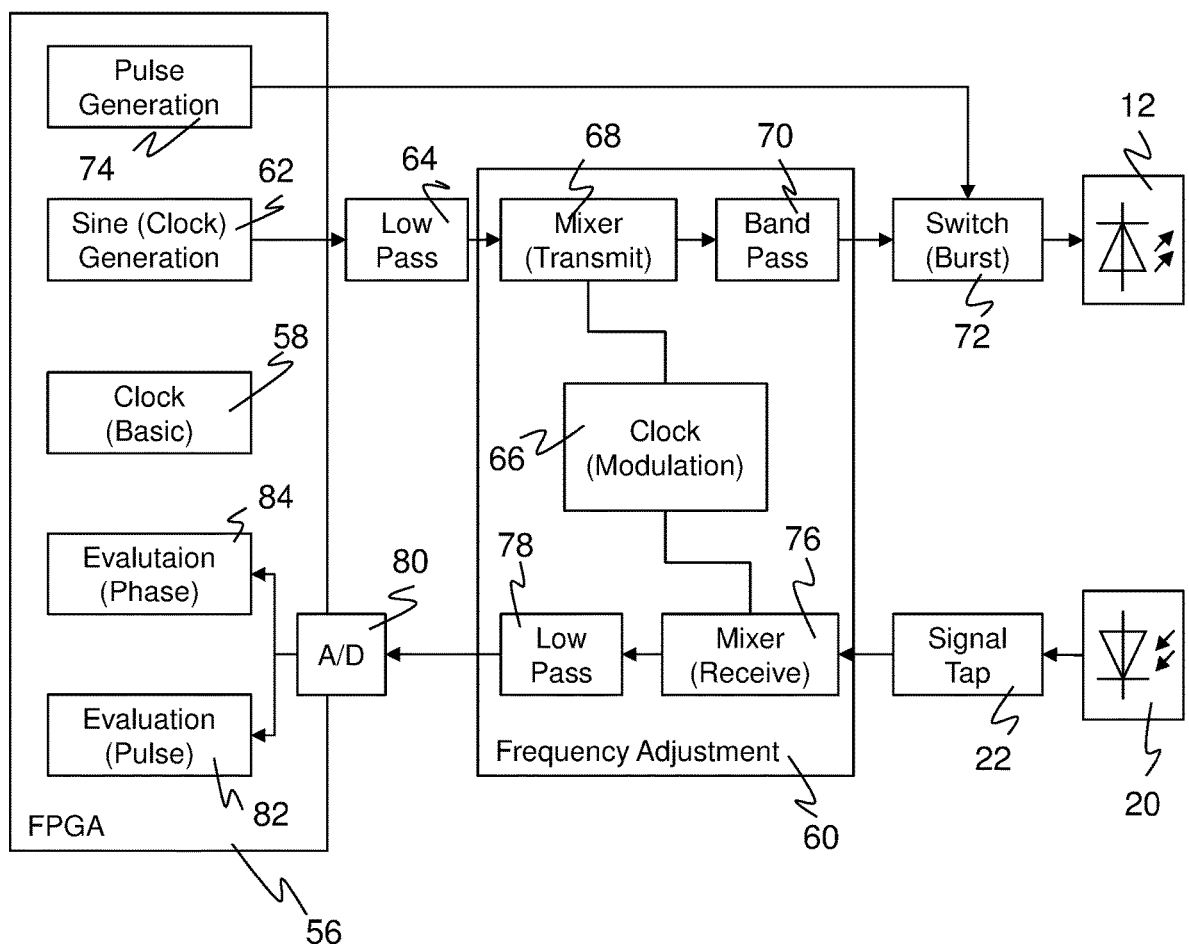
FIG. 3 a block diagram of an embodiment of a measuring core for a light time of flight measurement.

FIG. 3 shows a block diagram of an embodiment of a measuring core for the sensor 10. The analog and digital circuits of the measuring core together form the control and evaluation unit 24. In large blocks, a digital processing element 56 is provided which is designated FPGA (Field Programmable Gate Array) and operates with an internal or external basic clock source 58 on a base frequency of, for example, 10-400 MHz. A frequency adjustment unit 60 mixes up to a higher modulation frequency of 500 MHz, some GHz or even higher in the transmission path of the digital processing element 56 and, accordingly, mixes down the reception signal from the modulation frequency back to the base frequency. Thus, the signal generation and evaluation in the digital processing element 56 operates on the comparatively low and manageable base frequency, and only the optical path uses the higher modulation frequency, i.e. the converters between electrical and optical signal in the form of light transmitter 12 and light receiver 20 with signal tap circuit 22, and the light signal itself.

Figure 4:
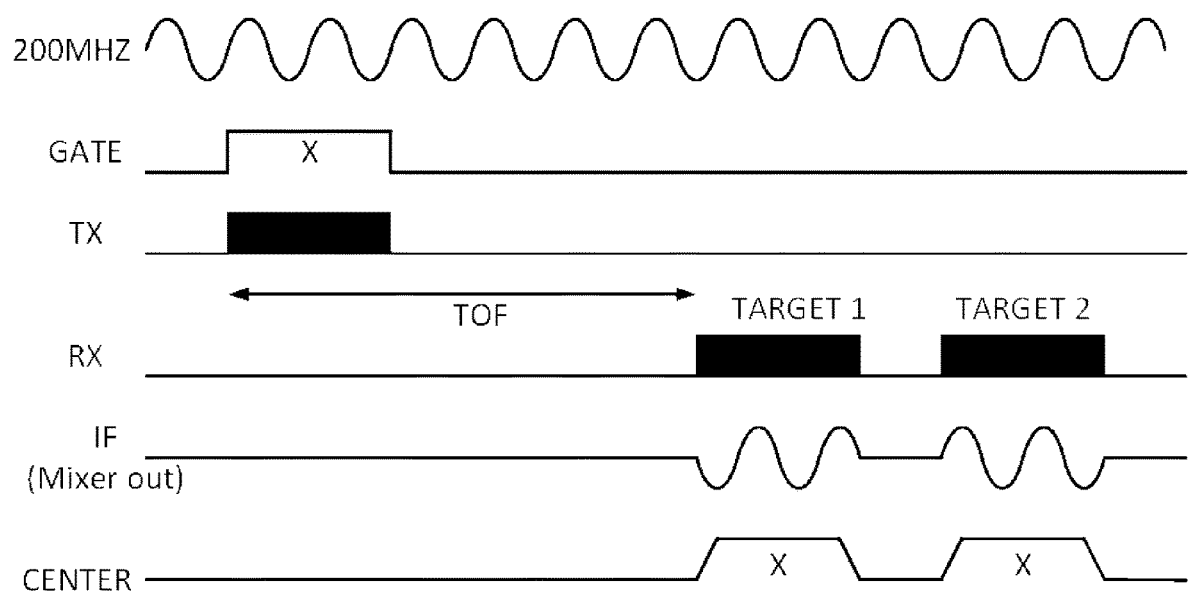
FIG. 4 exemplary signal courses in different stages of a light time of flight measurement.

The light time of flight measurement using the measurement core as shown in FIG. 3 is now explained in detail, starting in the upper left-hand corner with the signal generation in a clockwise direction up to the digital evaluation in the lower left-hand corner, wherein the signals at selected points of the measurement core are shown in FIG. 4.

In the digital processing element 56, an oscillation generating unit 62 provides a periodically modulated signal for a phase measurement. Preferably, this is initially simply the basic clock provided by the basic clock source 58, which is then available at an output of the digital processing element 56. Then, a first low-pass filter 64 converts the basic clock into a sine wave of the base frequency. The top of FIG. 4 shows such a continuous periodic signal as the starting point, the frequency of which is 200 MHz by way of example.

This sine signal is mixed up to a higher modulation frequency in the frequency adjustment unit 60. For this purpose, the frequency adjustment unit 60 has a further clock generator 66 of for example 2 GHz, which synthesizes this frequency from an input clock using a PLL or the like. The input clock is preferably provided by the same system quartz, not shown, which is also used by the basic clock source 58 to generate the basic clock.

A transmission-side mixer 68 generates a mixed signal from the input signal, in the example a sine wave of 200 MHz, and the higher frequency of the further clock generator 66 of for example 2 GHz. Undesired signal components are suppressed by a bandpass filter 70, which may for example be configured as a SAW filter. A continuous periodic signal of the higher modulation frequency is thus provided at the output of the frequency adjustment unit 60, in this example at 1.8 GHz, and forwarded to a burst generation unit 72.

Parallel to this, a pulse of for example 10 ns is generated by a pulse generating unit 74. The pulse can be understood as a time window for switching on and off (gating), which is therefore illustrated in FIG. 4 with the designation GATE. In this function, the pulse is used by the burst generation unit 72, which lets the continuous periodic signal pass just during the pulse and blocks it outside the pulse, like a switch. The result is the transmission signal, namely, a pulse or burst of length 10 ns modulated at 1.8 GHz. The fast modulation of the TX transmission signal is not shown in FIG. 4 in its individual oscillations, but only merged as a black block.

The transmission signal is transmitted via light transmitter 12 and, after remission at one or more objects 16, impinges on an avalanche photodiode element 20 representing the light receiver 18 as an example. The reception signal is read out by means of signal tap circuit 22. In the example in FIG. 4, the reception signal RX has been remitted by two objects, and accordingly there are two modulated reception pulses TARGET1 and TARGET2. The time interval between the modulated pulse in the transmission signal TX and the reception pulses TARGET1 and TARGET2 is the light time of flight to be measured.

The signal tap circuit 22 feeds the reception signal to the frequency adjustment unit 60, where it is mixed down to the base frequency by a reception-side mixer 76 with the aid of the further clock generator 66. Unwanted mixing components are then suppressed by a second low-pass filter 78.

The result is a reception signal in which the modulation is significantly slower during the reception pulses. For this reason, the individual periods of the oscillation become visible again in the representation of this mixed down reception signal IF of FIG. 4. In order to enable the digital processing element 56 to evaluate the reception signal, it is digitized in an A/D converter 80. This can be a multi-bit sampling. In particular in the case of a light time of flight measurement based on a statistical evaluation of several individual measurements with respective individual pulses or individual bursts, i.e. a pulse averaging method or a burst averaging method, the comparatively complex multi-bit sampling can be replaced with binarization, as in EP 1 972 961 B1 directly via the inputs of the digital processing unit 56, or possibly with a few thresholds as in EP 2 942 645 B1 or EP 2 942 644 B1. This is a tradeoff between circuitry costs and required accuracy.

In digital processing element 56, the reception signal is evaluated with a pulse evaluation unit 82 on the one hand and a phase evaluation unit 84 on the other. The pulse evaluation unit 82 determines the position of the modulated pulses TARGET1 and TARGET2, such as their center of gravity, and the result can be a pulse center as illustrated in FIG. 4 with the signal CENTER. The distance between the centers of gravity in the CENTER signal and the original pulse signal GATE of the transmit path is already a first value for the respective light time of flight to the two objects of the example, but not yet highly accurate due to the comparatively large pulse width of 10 ns.

Therefore, the phase evaluation unit 84 also determines the phase offset of the modulation within the modulated reception pulses TARGET1 and TARGET2 compared to the output signal designated 200 MHz in FIG. 4. With this phase offset, the time position of the modulated reception pulses TARGET1 and TARGET2 can be determined even more precisely. The position of the centers of gravity according to the pulse evaluation in the CENTER signal resolves the ambiguity of the phase method; the phase only determines the residual light time of flight within a period of the modulation frequency of in this example 1.8 GHz.

Thus, a pulse-based and a phase-based light time of flight method based on transmitted modulated pulses or bursts are combined. A pulse method is used to determine the position of a modulated reception pulse and thus a relatively coarse distance value. In a second step, the phase position of the modulation is analyzed and the distance value is refined. The measurement accuracy corresponds to a phase measurement of the high modulation frequency, wherein the integrated transmission power is significantly reduced by the bursts and the uniqueness problem is solved by the evaluation of the pulse position.

Figure 5:
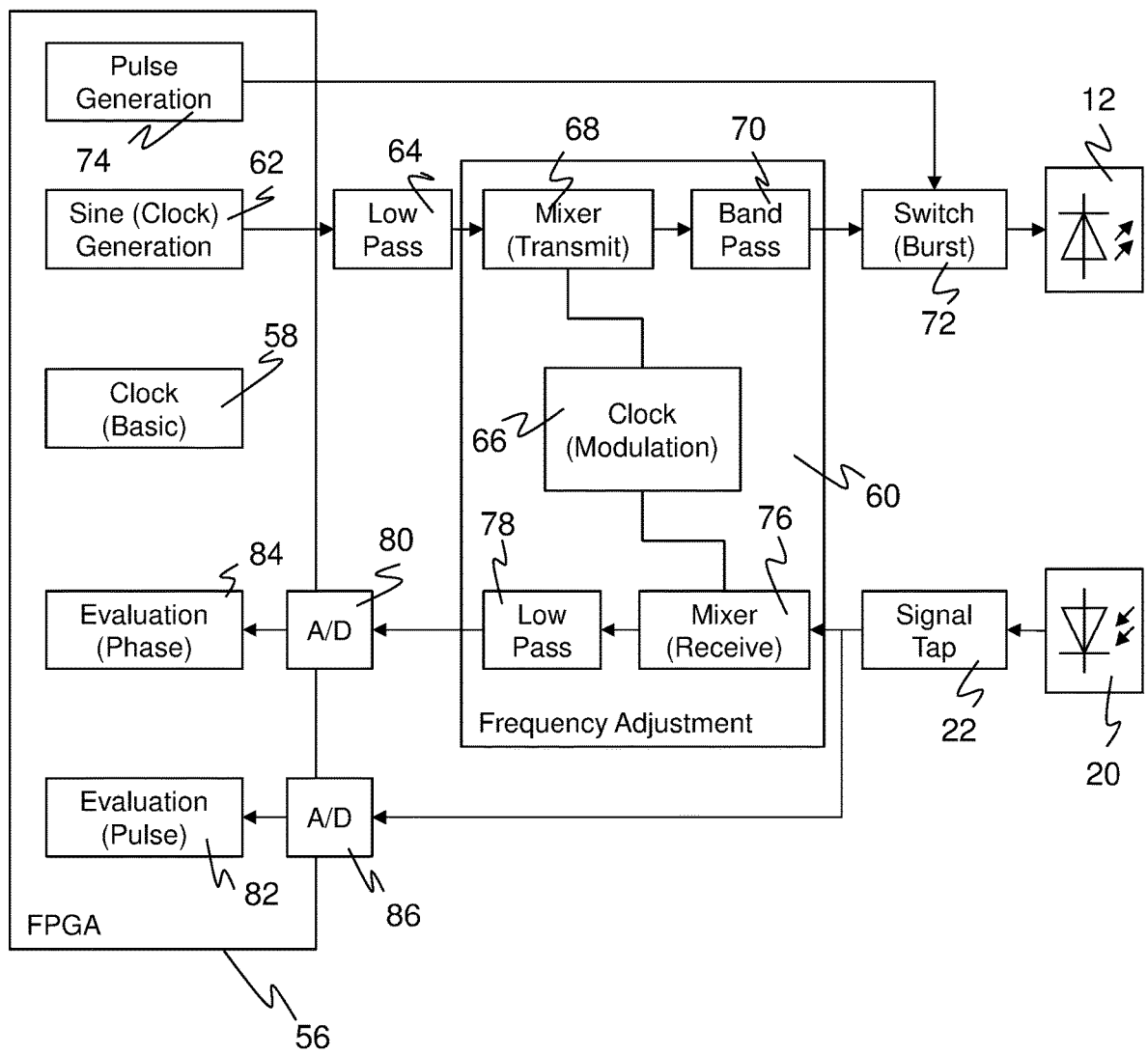
FIG. 5 a block diagram of another embodiment of a measuring core similar to FIG. 3, but with separate reception paths.

FIG. 5 shows a block diagram of another embodiment of a measuring core for the sensor 10. This largely corresponds to FIG. 3. However, in FIG. 3, the pulse evaluation and the phase evaluation are based on the reception signal after mixing down.

Alternatively, as in FIG. 5, the original reception signal of the signal tap circuit 22 can be fed directly to the digital processing element 56 for pulse evaluation in order to avoid distortions caused by the mixing process and to obtain an envelope curve of the pulse shape with more sampling points. FIG. 5 shows an A/D converter 86 at the transition of the additional reception path for pulse evaluation to the digital processing element 56. Instead of a complete A/D conversion, a binarization or a few thresholds may be sufficient.

Figure 6:
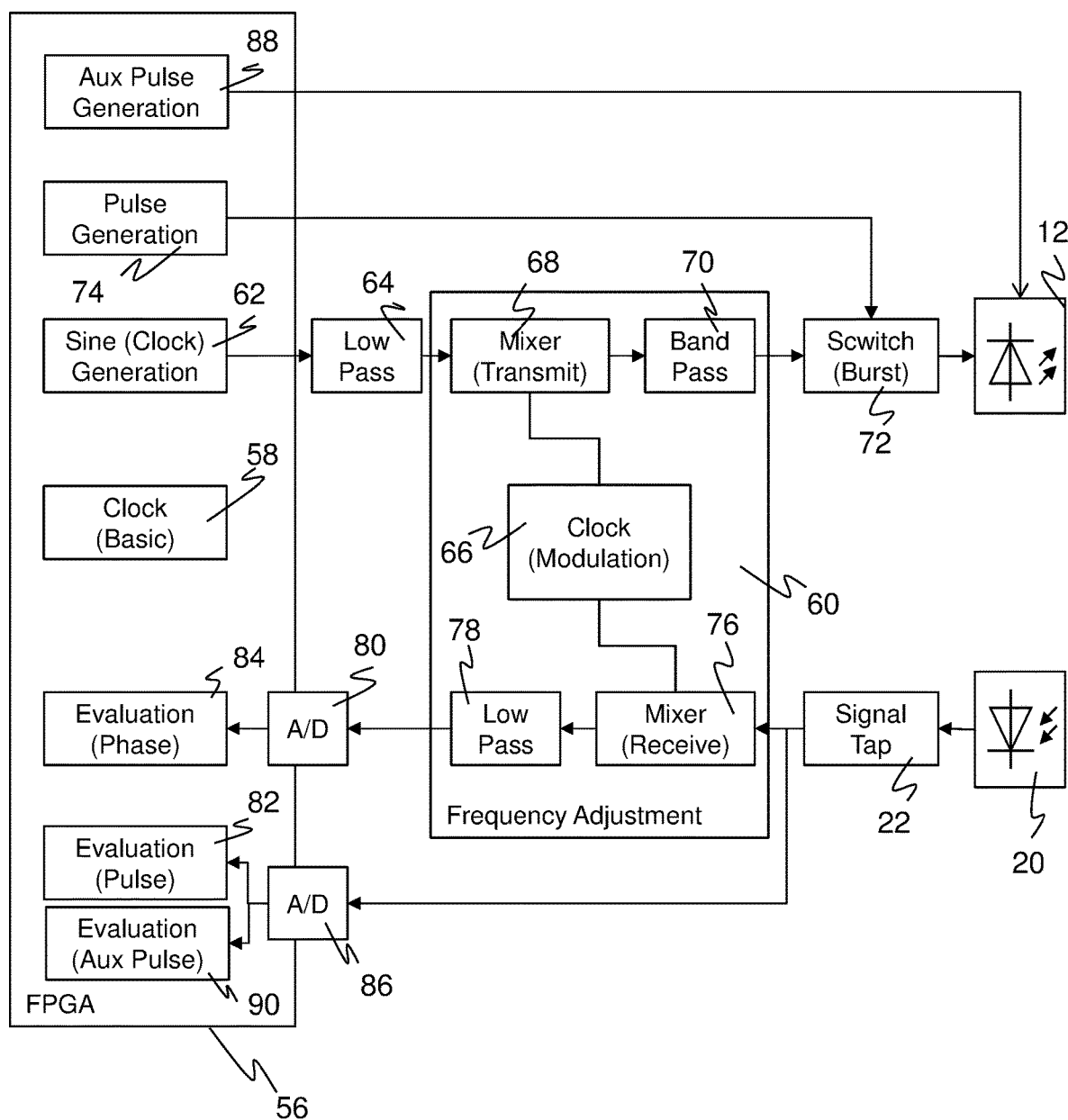
FIG. 6 a block diagram of another embodiment of a measuring core with auxiliary pulses.

FIG. 6 shows a block diagram of another embodiment of a measuring core for a light time of flight measurement with the sensor 10. The measuring core has a similar configuration as in to FIG. 5, but adds an auxiliary measurement with an auxiliary pulse. For this purpose, an auxiliary pulse generation unit 88 is additionally provided in the digital processing element 56, which controls the light transmitter 12 to generate short pulses of for example 2 ns duration. At the reception side, a corresponding auxiliary pulse evaluation unit 90 is added. It is shown as a separate block next to the pulse evaluation unit 82, but can be implemented at least partially together with it and preferably receives the same or a similar reception signal.

The auxiliary pulse is used for an additional pulse measurement. In principle, a single pulse measurement with the auxiliary pulse is conceivable. It should be noted, however, that only a certain laser or transmission budget is available at any one time, which the single auxiliary pulse has to share with the modulated pulse. Furthermore, the auxiliary pulse and the modulated pulse also overlap on the reception side, which could hardly be separated, in particular in case of multiple targets. Therefore, a pulse averaging method is preferably used. This not only has the advantage that it can operate with weak auxiliary pulses. It also offers the possibility of suppressing interference effects of the auxiliary pulse on the measurement with the modulated pulse.

For this purpose, different repetition frequencies are selected for the auxiliary pulse and the modulated pulse. As an example, the auxiliary pulse is delayed by an additional 10 ns relative to the modulated pulse with each measurement repetition. The result is that the auxiliary pulse is successively shifted backwards in the reception signal relative to the modulated pulse. With a pulse averaging method synchronized to the modulated pulses, the auxiliary pulse will vanish due to the averaging. Conversely, the evaluation of the auxiliary pulse can be synchronized on its repetition frequency for a constructive superposition in the course of the measurement repetitions.

With the additional light time of flight measurement using the auxiliary pulse, the uniqueness of the phase measurement can be further improved, for example in the case of two semi-transparent targets very close to one another. The modulated pulse needs to have a certain duration, because it otherwise contains too few modulations, whereas the duration of the auxiliary pulse may be as short as desired, limited only by technical limitations of its generation. Therefore an auxiliary pulse is even better suited to resolve ambiguities. In principle, the light time of flight measurement with an auxiliary pulse could even replace the measurement based on the reception of the modulated pulse.

Figure 7:
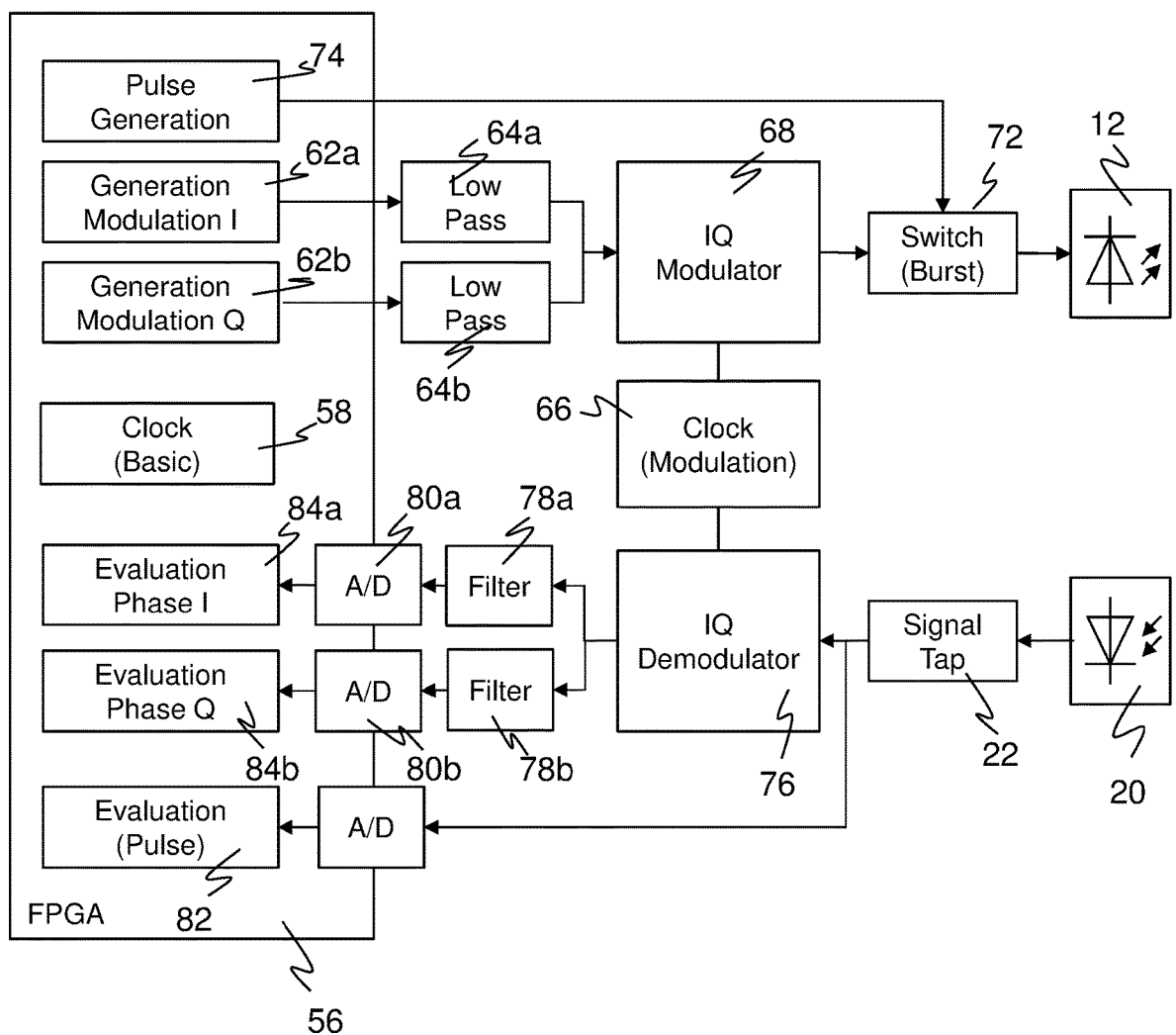
FIG. 7 a block diagram of another embodiment of a measuring core with IQ mixers.

FIG. 7 shows a block diagram of another embodiment of a measuring core for light time of flight measurement with the sensor 10. Again, the configuration is similar to FIG. 3. The main difference is that an IQ modulator is used as the transmission-side mixer 68 and, accordingly, an IQ demodulator is used as the reception-side mixer 68. In further embodiments, only the transmission path uses IQ modulation or only the reception path uses IQ demodulation, respectively.

In accordance with the quadrature amplitude modulation, two subpaths are now provided for the respective I and Q signals. On the transmission side, there is an oscillation generating unit 62 a-b for I and Q, each with a subsequent low-pass filter 64a-b in order to obtain a sine signal from the clock for the modulation of the bursts. The output signal of the low-pass filters 64a-b can be used for phase control of the oscillation generating units 62a-b. Bandpass filter 70 may be omitted in an embodiment with IQ modulator. In addition, it is possible to switch very fast between the upper and lower sideband, in particular by inverting the baseband signal, without detuning the further clock generator 66, so that for example settling times of a PLL of the further clock generator 66 are avoided. In the numerical example used above, with a base frequency of 200 MHz and a clock of 2 GHz of the further clock generator 66, it is possible to switch between 1.8 GHz and 2.2 GHz very fast and with virtually no interfering transient effects. In a modification of FIG. 7, a further path for the inverted baseband signal I could also be provided for optional switching to that path, in addition to the transmission paths for I and Q. A measurement with different frequencies can be used, apart from the general possibilities of avoiding conflicts in the frequency space, for a phase measurement with multiple frequencies to extend the uniqueness range.

As an aside, a fast switching for a frequency change is also possible in an embodiment without IQ modulator, such as in a modified embodiment of FIG. 3. To this end, two bandpass filters are connected to mixer 68 instead of only one bandpass filter 70, and a downstream switch selects either the output signal of the one or the other bandpass filter to be supplied to burst generating unit 72. The passband frequencies of the two bandpass filters correspond to the upper sideband frequency or the lower sideband frequency, for example at 1.8 GHz or 2.2 GHz with the previous numerical values. The switch is able to very fast switch between the two bandpass filters and thus the two frequencies of the sidebands. As an alternative for two bandpass filters with fixed frequencies, an adjustable high-frequency filter is also conceivable.

Back to FIG. 7, after the IQ demodulation, the I signal and the Q signal are processed individually on the reception side. Suitable filters 78a-b could be for example notch filters, low-pass filters or combinations of these, tuned to the modulation frequency or the base frequency. After A/D conversion 80a-b, which again may be binarization or sampling with a few thresholds, twice as much information is available in signal components I and Q during evaluation 84a-b of the phase, for example zero crossings, so that the phase position or phase offset can be determined even more precisely.

The pulse evaluation 82 and the combination of the results from the pulse evaluation 82 and the phase evaluation 84a-b are carried out as explained in the context of FIG. 3. However, in the embodiment of FIG. 7, the reception signal preferably is directly supplied to the pulse evaluation 82 by the signal tap circuit 22 as in FIG. 5, i.e. without IQ demodulation.

Figure 8:
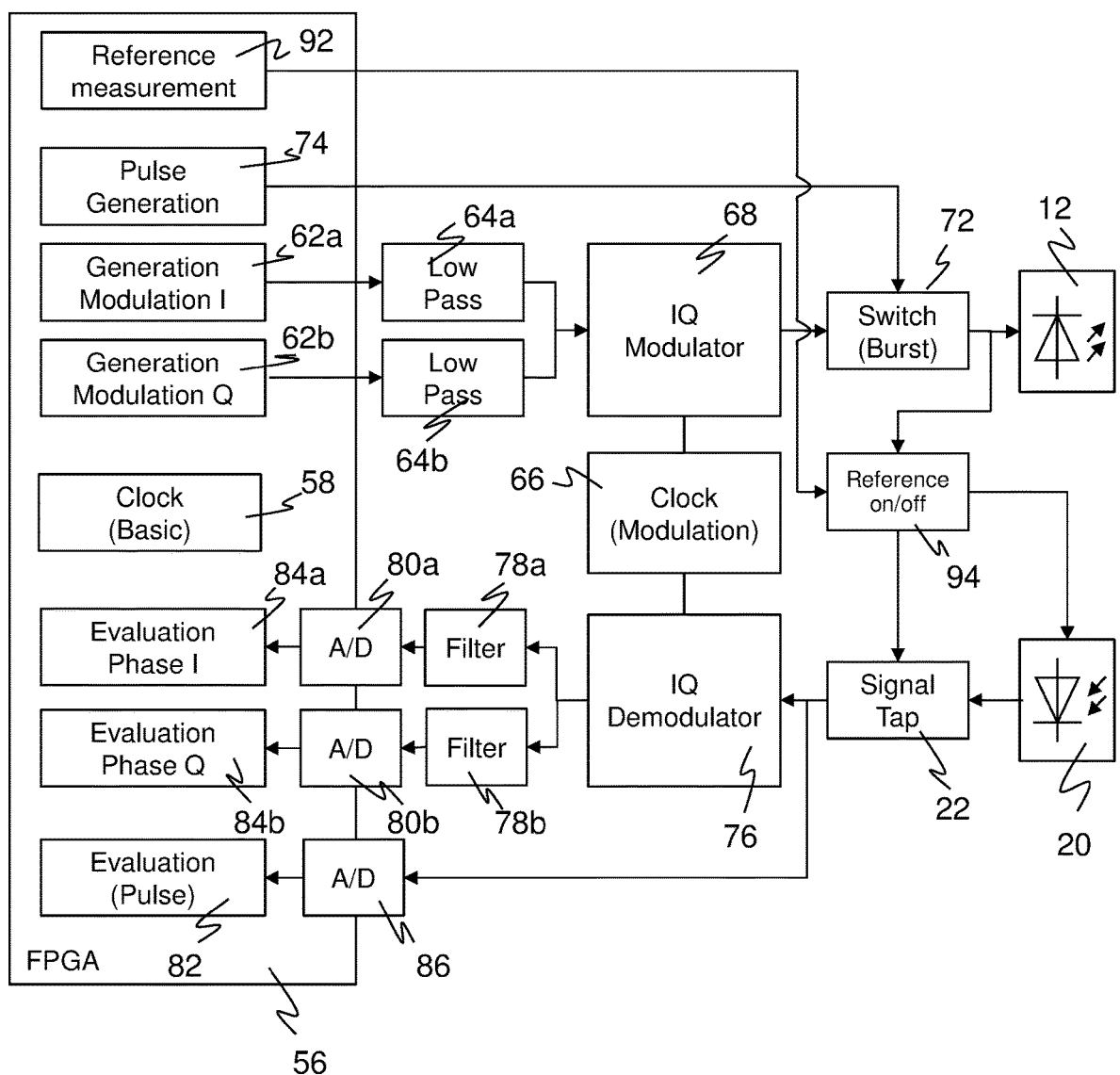
FIG. 8 a block diagram of another embodiment of a measuring core with IQ mixers similar to FIG. 7, but with an electronic reference measurement.

A reference channel is added in further embodiments. FIG. 8 shows an embodiment with an electrical reference. In addition to the embodiment according to FIG. 7, a reference measurement unit 92 is provided in the digital processing element 56 and a reference measurement switch 94 connected to the transmission and reception stage. The electrical transmission signal controlling the light transmitter 12 is also fed to the reference measuring switch 94 as a reference signal. Thus, the reference signal includes all effects on the transmission signal which would affect the light time of flight and in particular the phase and lead to measurement errors. The reference measurement switch 94 is also connected to the light receiver 18 in order to be able to switch it off or suppress its signal. In case of a SPAD light receiver with avalanche photodiode element 20, this can be done by reducing the bias voltage below the breakdown voltage. Furthermore, the reference measuring switch 94 is able to feed the reference signal into the reception path, either at the input or at the output of the signal tap circuit 22.

By means of the reference measurement unit 92, a reference measurement can now be carried out. The reference measuring switch 94 is switched to interrupt the actual measuring operation. The light receiver 20 is deactivated, and the reference signal is fed into the reception path instead of the reception signal. Thus, the internal effects on the time of flight and the phase can be determined and be taken into account in the measurement. A reference measurement is carried out at least at the factory or during setup. Preferably, the reference measurement takes place cyclically. As the drifts are mainly temperature-related, the reference measurement cycles do not need to be very short.

A simpler electrical reference could be done by feeding the baseband signal at the output of the first low-pass filter 64, designated 200 MHz in FIG. 4, which has formed a sine signal from the basic clock, to phase evaluation 84, since the low-pass filtering can cause a considerable phase shift, and this would be compensated for with the simpler reference.

Figure 9:
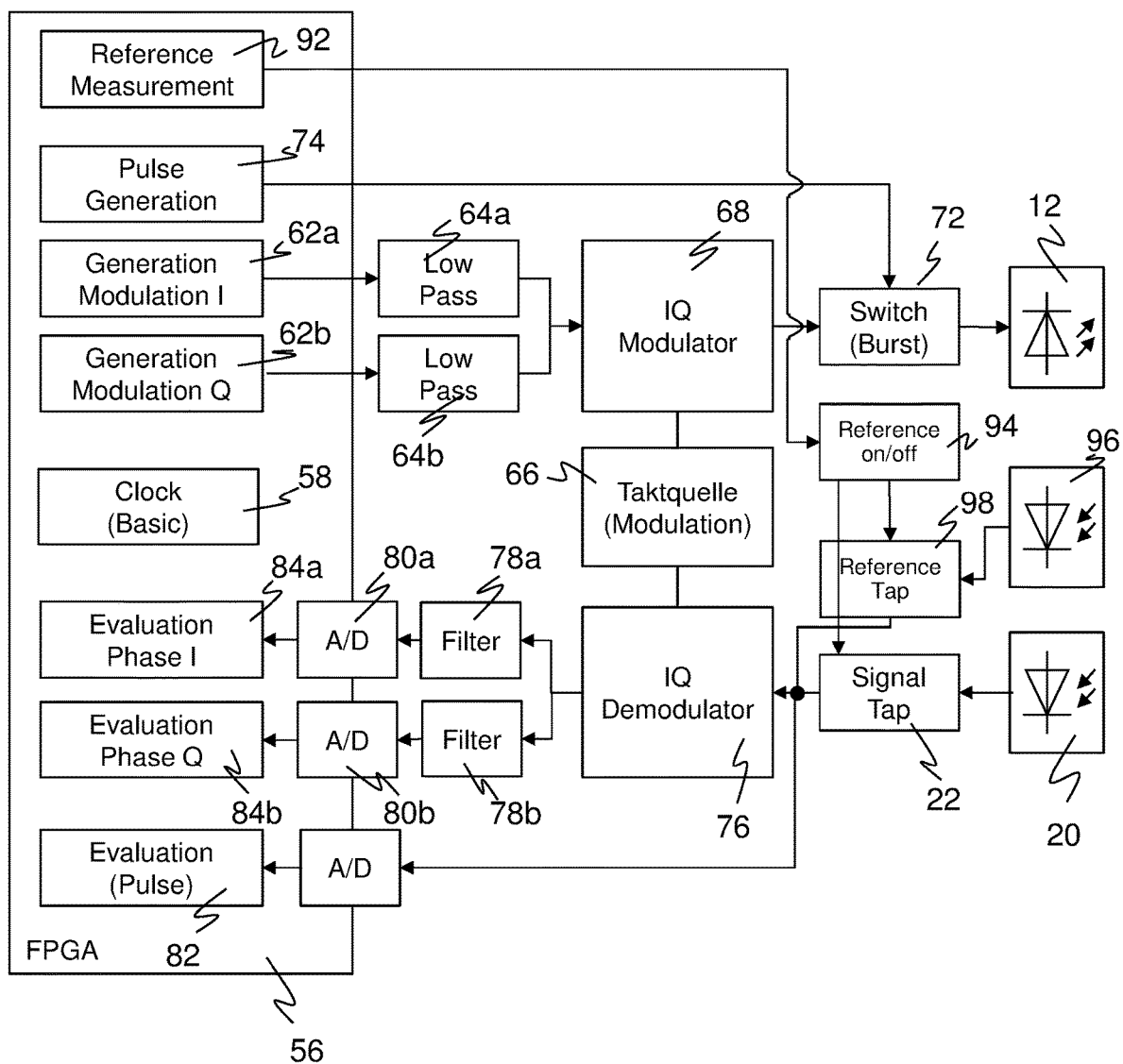
FIG. 9 a block diagram of another embodiment of a measuring core with IQ mixers similar to FIG. 7, but with an optical reference measurement.

FIG. 9 shows an embodiment with an optical reference. Unlike the electrical reference shown in FIG. 8, no electrical transmission signal is used as a reference, but rather an optical short-circuit is provided which returns a part of the transmission light on a defined reference path, preferably directly and thus without a light path through the monitoring area 14. As shown in FIG. 9, a reference receiver 96 is provided, in particular in the form of one or more dedicated avalanche photodiode elements 20 which are used as reference receiver 96. These reference elements can also be optically shielded from ambient light. The reference receiver 96 is read out by a reference tap circuit 98, which feeds its reference signal from the reference receiver 96 into the reception path instead of the reception signal. The reference measurement switch 94 is connected to signal tap circuit 22 and reference tap circuit 98 to suppress the respective inactive signal, which could also be done directly at the light receiver 18 as in FIG. 8. In another embodiment, the reference signal is read out by the signal tap circuit 22, and there is no reference tap circuit 98. With a multi-channel readout it is also conceivable to generate and evaluate the reference signal and the measuring signal simultaneously.

In the embodiments explained thus far, the pulse length and thus burst length as well as their temporal position were fixed. However, these parameters can also be varied, in particular in a pulse averaging method or burst averaging method between individual measurements.

The pulse duration, which determines the gate duration and thus the burst duration, is a compromise. Long gate durations allow many zero crossings for phase determination and/or a lower base frequency, both of which are helpful for easy and accurate measurement. On the other hand, with long bursts and multiple targets close to one another, there is the danger that long bursts merge, and therefore short gate durations would be more advantageous for a multi-echo capability. Therefore, an adaptation depending on the prioritization of the requirements as well as a switching between different gate durations can be advantageous.

It can be advantageous to shift the temporal position of the pulses and thus the gates by fractions of the base frequency in order to reduce adverse effects caused by the transients of various filter components, in particular low-pass filter 64 and bandpass 70. The transient effects for the modulated pulses depends on the initial phase and amplitude, respectively, and thus the gates. So if the gates are shifted, there are different transient effects. This enables an optimization of the reception signal for a better phase evaluation, in particular in case of multiple measurement repetitions, by averaging individual measurements with time positions of the gates distributed over a period. Then, the positive and negative effects during transients are balanced on average. In multi-frequency measurement, as described for some embodiments for example with two bandpass filters or an I/O mixer and alternative use of the two sidebands, individual measurements with time positions of the gates distributed over a period are preferably performed for both frequencies.

Obviously, the basic clock and the frequency of the further clock generator 66 are not limited to the example values of 200 Mhz and 2 GHz. Sensor 10 can also be configured to vary these values. One preferred possibility has already been mentioned, namely, the use of sidebands or inverted baseband signals in embodiments with an IQ mixer. In another preferred embodiment, further clock generator 66 provides a frequency which is not an integer multiple of the base frequency. This can for example be achieved by a slight detuning of a PLL of the further clock generator 66. Then, there is a small offset between multiples of the base frequency and the frequency of the further clock generator 66.

While the variation of gates described in the previous paragraph concerns the signal at the base frequency, the slight detuning of the frequency of the further clock generator 66 provides a similar effect in the signal at the modulation frequency, because the transient effects of the modulated pulse are varied by the beat effect, which in turn after several measurement repetitions leads to a compensation of interference by averaging and thus to reduction or elimination of measurement errors by averaging.

In the embodiments as shown, a digital processing element 56 and a separate frequency adjustment unit 60 are provided, the latter being replaced by IQ components 68, 76 in some cases. Without being shown in the Figures, embodiments are conceivable in which further or even all parts of the frequency adjustment unit 60 or the IQ components 68, 78 including connected elements are replaced by digital components, in particular integrated into the digital processing element 56.

Finally, it should be mentioned that some optional features and variants of the invention are only explained in connection with a certain embodiment, but can also be used or combined with other embodiments. This in particular applies to an additional pulse time of flight measurement with an auxiliary pulse, which has been explained with reference to FIG. 6 but is also conceivable in embodiments according to FIGS. 7 to 9 with IQ modulation, and to reference measurements explained with reference to FIG. 8 or 9, which could also be added to embodiments without IQ modulation as in FIGS. 3 to 6.

The invention claimed is:

1. A distance-measuring optoelectronic sensor (10) for detecting and determining a distance of an object (16) in a monitoring area (14), the sensor (10) having a light transmitter (12) for transmitting a transmission signal, a light receiver (18) for generating a reception signal and a control and evaluation unit (24) configured to determine a light time of flight from the reception signal and, from that, the distance of the object (16),
wherein the control and evaluation unit (24) is further configured to transmit at least one periodically modulated pulse as a transmission signal, to determine a reception time of the pulse in the reception signal and a phase offset of the modulation between transmission signal and reception signal in a neighborhood of the reception time and to determine the distance of the object (16) from the reception time and the phase offset,
and wherein the control and evaluation unit (24) provides a base frequency and comprises a transmission-side mixer (68) with a clock (66) faster than the base frequency for mixing up to a modulation frequency for modulating the pulse.

2. The sensor (10) according to claim 1,
wherein the pulse is modulated at a predetermined frequency selected from the group of one of at least 500 MHz, at least 1 GHz, or at least 2 GHz.

3. The sensor (10) according to claim 1,
wherein the transmission-side mixer (68) is configured as an I/Q mixer.

4. The sensor (10) according to claim 1,
wherein the clock (66) generates a frequency corresponding to a non-integer multiple of the base frequency.

5. The sensor (10) according to claim 1,
wherein the control and evaluation unit (24) is configured to change the modulation frequency.

6. The sensor (10) according to claim 5,
wherein the control and evaluation unit (24) is configured to change the modulation frequency by changing sidebands of the transmission-side mixer (68) which is configured as an I/Q mixer or by providing at least two band-pass filters of different passband frequency.

7. The sensor (10) according to claim 1,
wherein the control and evaluation unit (24) comprises a pulse generating unit (74) for setting time windows for the modulated pulse.

8. The sensor (10) according to claim 7,
wherein the control and evaluation unit (24) is configured to offset a time window by a fraction of a base frequency.

9. A distance-measuring optoelectronic sensor (10) for detecting and determining a distance of an object (16) in a monitoring area (14), the sensor (10) having a light transmitter (12) for transmitting a transmission signal, a light receiver (18) for generating a reception signal and a control and evaluation unit (24) configured to determine a light time of flight from the reception signal and, from that, the distance of the object (16),
wherein the control and evaluation unit (24) is further configured to transmit at least one periodically modulated pulse as a transmission signal, to determine a reception time of the pulse in the reception signal and a phase offset of the modulation between transmission signal and reception signal in a neighborhood of the reception time and to determine the distance of the object (16) from the reception time and the phase offset,
wherein the control and evaluation unit (24) is configured to base a determination of the distance on at least two measurements with modulated pulses of different length.

10. The sensor (10) according to claim 1,
wherein the control and evaluation unit (24) is configured to transmit an unmodulated auxiliary pulse and to determine its light time of flight.

11. The sensor (10) according to claim 1,
wherein the light receiver (18) comprises a plurality of avalanche photodiode elements (20), each of which is biased at a bias voltage above a breakdown voltage and thus operated in a Geiger mode.

12. The sensor (10) according to claim 11,
wherein a signal tap circuit (22) is provided, which has an active coupling element (44) with an input (46) which is connected to the avalanche photodiode elements (20) and an output (48), the active coupling element (44) mapping a Geiger current at the input (46) to a measuring current corresponding to the Geiger current in course and level, wherein the input forms a virtual short circuit against a potential for the Geiger current and the output (48) is decoupled from the input (44).

13. The sensor (10) according to claim 12,
wherein the coupling element (44) has exactly one signal tap transistor.

14. The sensor (10) according to claim 1,
wherein the control and evaluation unit (24) has a reception-side mixer (76) which mixes the reception signal down to a base frequency while maintaining the phase.

15. The sensor (10) according to claim 14,
wherein the reception-side mixer (76) is an I/Q mixer.

16. The sensor (10) according to claim 1,
wherein the control and evaluation unit (24) has a first reception path (82) for determining the reception time and a second reception path (84) for determining the phase shift.

17. The sensor (10) according to claim 1,
wherein the control and evaluation unit (24) is configured to perform a plurality of individual measurements, each with at least one modulated pulse, to form a common reception signal from the individual measurements, and to evaluate the common reception signal for the determination of at least one of reception time and phase offset.

18. A method for detecting and determining the distance of an object (16) in a monitoring area (14), the method comprising:
using a control and evaluation unit (24) to determine a light time of flight from the reception signal and, from that, the distance of the object (16), the control and evaluation unit (24) providing a base frequency and using a transmission-side mixer (68) with a clock (66) faster than the base frequency for mixing up to a modulation frequency for modulating the pulse, wherein a transmission signal is transmitted by a light transmitter (12), a reception signal is generated by a light receiver (18) and a light time of flight is determined from the reception signal and, from that, the distance of the object (16), wherein at least one periodically modulated pulse is transmitted as a transmission signal, a reception time of the pulse in the reception signal and a phase offset of the modulation between transmission signal and reception signal in a neighborhood of the reception time are determined, and the distance of the object (16) is determined from the reception time and the phase offset.

\* \* \* \* \*